Dec. 31, 1940.    J. LACKEY    2,227,225
BEATER OR THRASHING CYLINDER FOR HARVESTERS
Filed Feb. 10, 1940
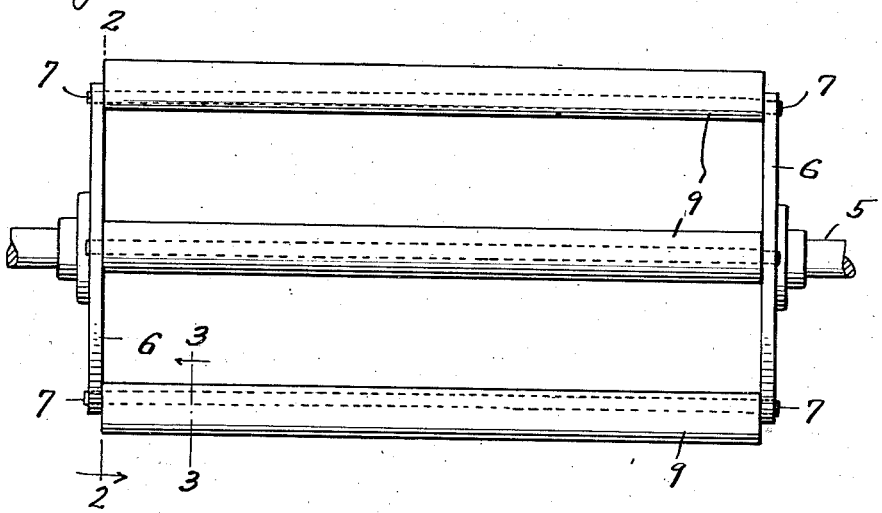
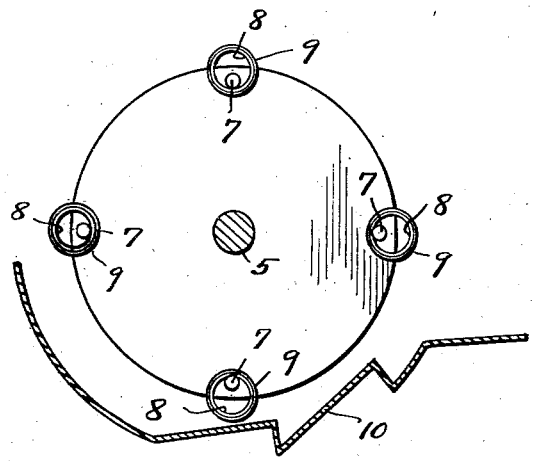
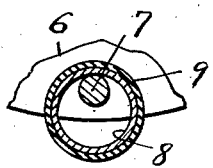
Inventor
James Lackey
By Clarence A. O'Brien
and Hyman Berman
Attorneys Patented Dec. 31, 1940

2,227,225

UNITED STATES PATENT OFFICE 2,227,225

BEATER OR THRASHING CYLINDER FOR HARVESTERS

James Lackey, Ovalo, Tex.

Application February 10, 1940, Serial No. 318,352

1 Claim. (Cl. 130—27)

This invention relates to beaters or thrashing cylinders for harvesters, and has for the primary object the provision of a device of this character which will efficiently separate grain from straw without subjecting the latter to a chopping or crushing action to permit the straw to pass through the harvester whole and with the least amount of mutilation thereto and also will permit stones and other hard foreign substances which might enter the thrasher to pass therethrough without subjecting the device to injury or damage.

With these and other objects in view, the invention consists in certain novel feature of construction, combination and arrangement of parts to be hereinafter more fully described and claimed.

For a complete understanding of my invention, reference is to be had to the following description and accompanying drawing, in which:

Figure 1 is a side elevation illustrating a beater or thrashing cylinder for harvesters, constructed in accordance with my invention.

Figure 2 is a sectional view taken on the line 2—2 of Figure 1 showing the present invention associated with a fragmentary portion of a concave of a harvester.

Figure 3 is a transverse sectional view taken on the line 3—3 of Figure 1.

Referring in detail to the drawing, the numeral 5 indicates a shaft adapted to be supported and driven in the usual manner found in thrashing machine construction and has secured thereon spaced heads or discs 6 provided adjacent the peripheries thereof with openings to receive supporting rods 7. The rods 7 have loosely mounted thereon cylinder type bars 8 of a length substantially equal to the distance between the heads or discs 6. The cylindrical bars are provided with a cushion covering 9 constructed of rubber or any other material suitable for the purpose.

As before stated the bars 8 are loosely mounted on the rods 7 so that during the rotation of the shaft 5 the bars will be thrown outwardly by centrifugal action and will just clear the concave 10 of the thrasher so as to subject the straw and grain to a beating and flailing action to efficiently remove the grain from the straw without subjecting the latter to an undue crushing or chopping action, permitting the straw to leave the thrasher in substantially whole condition.

It will be seen that as the bars rotate past the concave they subject the straw and grain to a rubbing action and should any hard substances, such as stones or the like, enter the thrasher along with the straw the bars are free to move inwardly when engaged by said substances so as not to become damaged thereby.

It is believed that the foregoing description, when taken in connection with the drawing will fully set forth the construction and advantages of this invention to those skilled in the art to which such a device relates, so that further detailed description will not be required.

Having thus described the invention, what I claim is:

In a device of the character described, a power driven shaft, disc shaped heads mounted on said shaft and arranged in spaced relation, rods connected to said heads adjacent the peripheries thereof, tubular shaped rigid bars loosely mounted on said rods and of a length substantially equal to the distance between said heads and capable of moving outwardly of the peripheries of the heads by centrifugal action, and cushion coverings for said bars.

JAMES LACKEY.